(12) United States Patent
Jha et al.

(10) Patent No.: US 9,988,288 B2
(45) Date of Patent: Jun. 5, 2018

(54) DEVICES AND METHODS FOR STORING, PROCESSING, AND DELIVERING A PROCESSED LIQUID

(71) Applicant: HydroNovation, Inc., San Francisco, CA (US)

(72) Inventors: Anil D. Jha, San Francisco, CA (US); Ramandeep Mehmi, Livermore, CA (US); Benjamin Rush, Oakland, CA (US)

(73) Assignee: HydroNovation, Inc., La Palma, CA (US)

(*) Notice: Subject to any disclaimer, the term of this patent is extended or adjusted under 35 U.S.C. 154(b) by 434 days.

(21) Appl. No.: 14/431,644

(22) PCT Filed: Sep. 27, 2013

(86) PCT No.: PCT/US2013/062204
§ 371 (c)(1),
(2) Date: Mar. 26, 2015

(87) PCT Pub. No.: WO2014/052769
PCT Pub. Date: Apr. 3, 2014

(65) Prior Publication Data
US 2015/0246831 A1    Sep. 3, 2015

Related U.S. Application Data

(60) Provisional application No. 61/707,598, filed on Sep. 28, 2012.

(51) Int. Cl.
*B01F 5/06* (2006.01)
*C02F 1/469* (2006.01)
(Continued)

(52) U.S. Cl.
CPC .......... *C02F 1/4695* (2013.01); *B01F 5/0608* (2013.01); *B01F 5/0695* (2013.01);
(Continued)

(58) Field of Classification Search
CPC ...................................................... B01F 5/0608
(Continued)

(56) References Cited

U.S. PATENT DOCUMENTS 2,529,028 A * 11/1950 Landon .................. C02F 1/685
137/102
3,257,315 A * 6/1966 Pall ........................ C02F 1/505
210/501
(Continued)

FOREIGN PATENT DOCUMENTS

| CN | 101111303 A | 1/2008 |
|---|---|---|
| CN | 201603553 U | 10/2010 |
| WO | 2009055291 A2 | 4/2009 |

OTHER PUBLICATIONS

International Search Report and Written Opinion in corresponding PCT/US13/62204, dated Feb. 7, 2014.

*Primary Examiner* — David Sorkin
(74) *Attorney, Agent, or Firm* — Lando & Anastasi, LLP

(57) ABSTRACT

Systems and methods for controlling mixing between one or more fluids are provided. The systems and methods may utilize a vessel comprising one or more zones where the zones are configured to minimize mixing between one or more fluids. Certain systems and methods may utilize a vessel comprising a tortuous flow path. Other systems and methods may utilize a vessel comprising one or more zones.

10 Claims, 9 Drawing Sheets

(51) Int. Cl.
  *B01F 15/00* (2006.01)
  *C02F 1/44* (2006.01)
  *C02F 5/00* (2006.01)
  *C02F 101/10* (2006.01)

(52) U.S. Cl.
  CPC .......... *B01F 15/00188* (2013.01); *C02F 1/44* (2013.01); *C02F 1/4691* (2013.01); *C02F 1/4693* (2013.01); *C02F 5/00* (2013.01); *C02F 2101/10* (2013.01); *C02F 2201/46* (2013.01); *C02F 2303/22* (2013.01)

(58) Field of Classification Search
  USPC ........................................ 222/373, 394, 395
  See application file for complete search history.

(56) References Cited

U.S. PATENT DOCUMENTS

| | | |
|---|---|---|
| 3,927,802 A | 12/1975 | Lavochkin et al. |
| 4,335,703 A | 6/1982 | Klank |
| 4,664,294 A | 5/1987 | Hetherington |
| 6,343,672 B1 | 2/2002 | Petela et al. |
| 7,846,340 B2 | 12/2010 | Freydina et al. |
| 2005/0109703 A1 | 5/2005 | Newenhizen |
| 2006/0157422 A1 | 7/2006 | Freydina et al. |
| 2007/0151018 A1 | 7/2007 | Palkon |

\* cited by examiner

DEVICES AND METHODS FOR STORING, PROCESSING, AND DELIVERING A PROCESSED LIQUID

CROSS-REFERENCE TO RELATED APPLICATIONS

This application is the U.S. National Phase Application under 35 U.S.C. § 371 of International Application No. PCT/US2013/062204, filed Sep. 27, 2013, titled DEVICES AND METHODS FOR STORING, PROCESSING, AND DELIVERING A PROCESSED LIQUID, which claims priority to U.S. Provisional Application No. 61/707,598, filed Sep. 28, 2012, titled DEVICES AND METHODS FOR STORING, PROCESSING, AND DELIVERING A PROCESSED LIQUID, both of which are hereby incorporated herein by reference in their entireties for all purposes.

FIELD OF THE TECHNOLOGY

Aspects relate generally to storing and delivering one or more liquids and, more particularly, to methods and systems for storing and delivering one or more liquids in a treatment process comprising at least one vessel.

SUMMARY

In accordance with one or more embodiments, a method of controlling mixing between a first fluid and a second fluid is provided. The method comprises providing at least one vessel comprising a tortuous flow path and a first port and a second port, introducing the first fluid to the at least one vessel through the first port, and removing the first fluid from the at least one vessel through the first port while introducing the second fluid to the at least one vessel through the second port, wherein the tortuous flow path minimizes mixing between the first fluid and the second fluid. In at least one embodiment, the tortuous flow path is provided by a plurality of baffles. In another embodiment, the tortuous flow path is provided by a tubular structure. In other embodiments, the tortuous flow path is provided by packing material.

According to one or more embodiments, a method of controlling mixing between a first fluid and a second fluid is provided. The method comprises providing at least one vessel comprising a first zone, a second zone, a first port, and a second port, introducing the first fluid to the first zone of the at least one vessel through the first port, and removing the first fluid from the first zone of the at least one vessel through the first port while introducing the second fluid to the second zone through the second port, wherein the first and second zone minimize mixing between the first fluid and the second fluid. In at least one embodiment, the first and second zones are defined by a bladder positioned within the vessel.

At least one embodiment is directed to a method of providing product liquid. The method comprises passing a feed liquid through an electrochemical water treatment device to create product liquid having a volume, introducing at least a portion of the volume of product liquid to at least one of a first zone of a vessel and at least one point of use, removing at least a portion of the volume of product liquid present in the first zone of the vessel, and introducing the feed liquid to at least one of a second zone of the at least one vessel and the electrochemical water treatment device. In at least one embodiment, the method further comprises measuring the flow rate of any product liquid introduced to the at least one point of use. In another embodiment, the method further comprises calculating the volume of product liquid introduced to the at least one point of use based on the measured flow rate. In yet another embodiment, the method comprises controlling the introduction of any feed liquid introduced to the electrochemical water treatment device based on the volume of product liquid introduced to the at least one point of use.

BRIEF DESCRIPTION OF THE DRAWINGS

The accompanying drawings are not intended to be drawn to scale. For purposes of clarity, not every component may be labeled in the drawing, nor is every component of each embodiment of the invention shown where illustration is not necessary to allow those of ordinary skill in the art to understand the invention. In the drawings.

DETAILED DESCRIPTION

Figure 1:
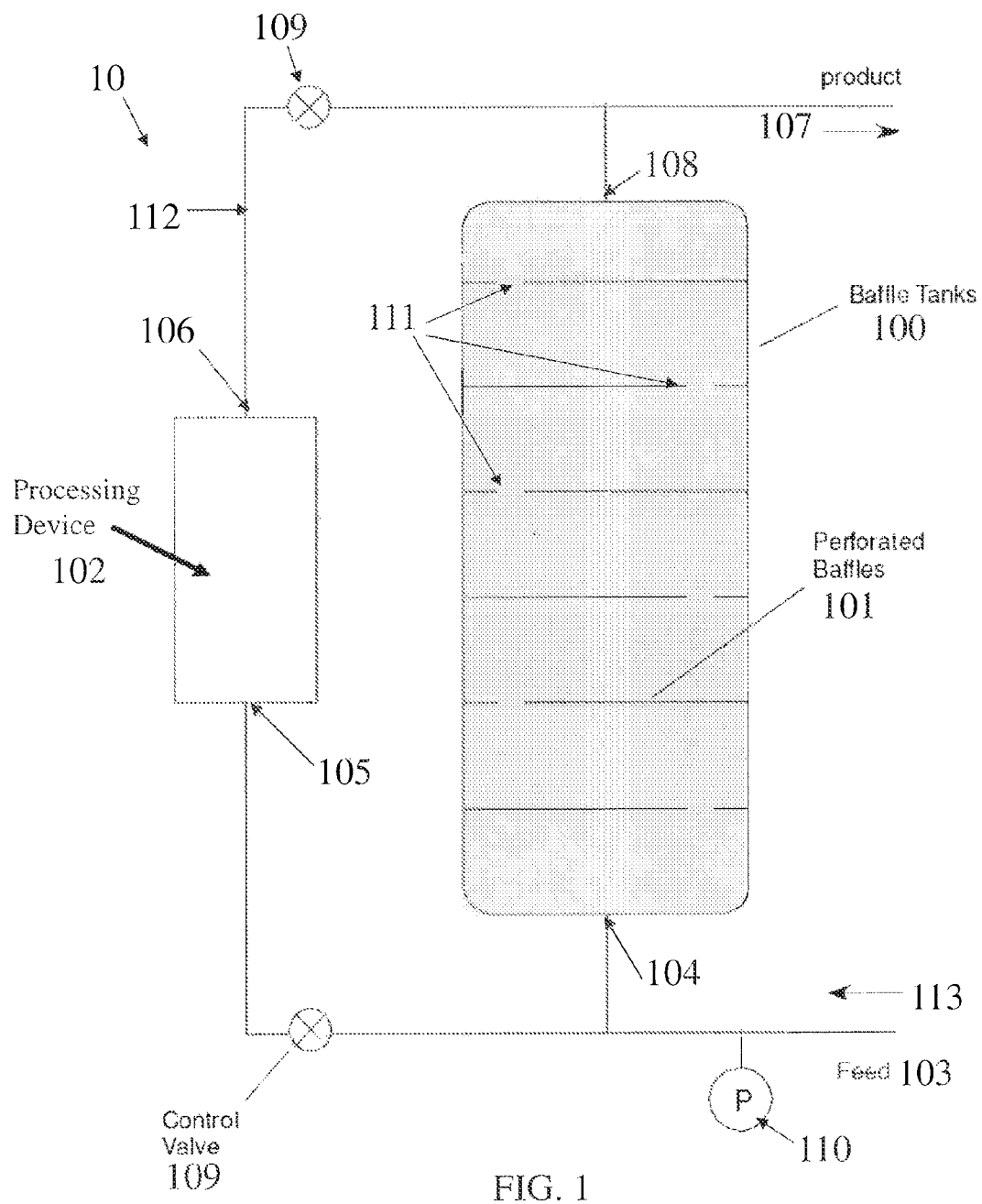
FIG. 1 is a diagram of a baffle tank system in accordance with one or more aspects of the disclosure.

Water available for residential use may contain a high concentration of naturally occurring minerals, collectively known as various hardness species. In particular, hardness is caused by compounds containing calcium and magnesium, as well as a variety of other metals, and is primarily a function of the geology of the area where the ground water is located. These minerals generally dissolve as charged ions. For example, calcium carbonate ($CaCO_3$) dissolves as charged $Ca^{2+}$ and $CO_3^{2-}$ ions. This compound dissolves from naturally occurring limestone in the cool environment of underground aquifers that provides the source of water for many municipal and well water supplies. When this water reaches the relatively warmer environment of a residence, the $CaCO_3$ may precipitate out of the water as a hard, adherent scale formation. Thus, the $Ca^{2+}$ ion is generally referred to as a "hard" ion. This scale can build up and clog residential appliances, particularly those that use heated water.

Calcium and magnesium dissolved in water are the two most common minerals that make water "hard," although iron, strontium, and manganese may also contribute to hardness. The hardness of water is referred to by three types of measurements: grains per gallon (gpg), milligrams per liter (mg/l), or parts per million (ppm). Hardness is usually reported as an equivalent quantity of $CaCO_3$. One grain of hardness equals 17.1 mg/l or 17.1 ppm of hardness. The typical guidelines for a classification of water hardness are: zero to 60 mg/l (≤4 gpg) of $CaCO_3$ is classified as soft water; 61 mg/l to 120 mg/l as moderately hard water (about 4 gpg to about 7 gpg); 121 mg/l to 180 mg/l (about 7 gpg to about 11 gpg) as hard water; and more than 180 mg/l (≥11 gpg) as very hard water.

One method for removing dissolved minerals from residential water is with electrochemical devices, for example, with continuous electrodeionization (CEDI). This method uses an applied electric field to pull the dissolved ions out of the water and through an ion exchange membrane where they are trapped, concentrated, and flushed away. The technique has many significant advantages over traditional methods of removing hard ions, such as water softening, but may suffer from the disadvantage that it may not be able to process water at the rate that it is used. For example, in a residence, water may be used at a higher rate in the early morning than during the day, or may be used on weekends at a higher rate than during a weekday. It is therefore desirable to have a means of storing fully processed water, unprocessed water, and water that is undergoing processing. This may be accomplished by providing a system with a reservoir that holds processed water. Processed water that is removed from the reservoir is replaced by incoming unprocessed water. One or more electrochemical devices may access the unprocessed water in the reservoir, process the water, and subsequently return processed water to the reservoir. The entire system is constructed to allow for minimal mixing between unprocessed and processed water.

Electrodeionization (EDI) is a process that can be used to demineralize, purify, or treat water by removing ionizable species from liquids using electrically active media and an electrical potential to influence ion transport. The electrically active media may function to alternately collect and discharge ionizable species, or to facilitate the transport of ions continuously by ionic or electronic substitution mechanisms. These devices can include media having a permanent or temporary charge, and can be operated to cause electrochemical reactions designed to achieve or enhance performance. These devices may also include electrically active membranes such as semi-permeable ion exchange or bipolar membranes. Non-limiting examples of electrochemical deionization units include electrodialysis (ED), electrodialysis reversal (EDR), electrodeionization (EDI), capacitive deionization, continuous electrodeionization (CEDI), and reversible continuous electrodeionization (RCEDI).

In accordance with one or more embodiments, the methods described herein relate to a method of controlling mixing between one or more fluids. For example, the method may control mixing between two fluids, where one fluid is a feed liquid and the other fluid is a product liquid. The feed liquid and the product liquid may be characterized as discussed below. In some embodiments, the fluids may be aqueous liquids. The method may include providing at least one vessel comprising a tortuous flow path. As used herein, the term "tortuous flow path" refers to any flow path having multiple changes of direction so as to inhibit flow of one or more fluids through the vessel. For example, the flow path could be characterized as serpentine, where the direction is gradually (using a plurality of 90 to 180 degree interfaces at section borders) or immediately (using at least one acute angle section interface) partially reversed at least once in a v-like or s-like pattern, and usually multiple times in an undulating pattern. The tortuous flow path may be created by including structures or materials within the vessel, or may be created from the construction of the vessel itself. For example, the vessel may include at least one of baffles, barriers, dispersers or flow redistributors, such as spaced horizontal perforated plates, grille bars, screens, packing, or other suitable structures or materials.

The tortuous flow path provided in the vessel may function to minimize mixing between one or more fluids within the vessel. The tortuous flow path has the effect of horizontally extending the flow path through the vessel while preventing backmixing and crossmixing of the one or more fluids within the vessel. For example, a first fluid may be introduced into a first port located at the top of a vessel. A second fluid may be introduced into a second port located at the bottom of the vessel. The first fluid may be product liquid and the second fluid may be feed liquid, as characterized and defined below. The tortuous flow path ensures that mixing between the two fluids is minimized, since the interface between the two liquids in the vessel is decreased. For example, at least one of feed liquid and product liquid may enter or exit the vessel through one or more ports in the vessel. Feed liquid may enter through a first port at the bottom of the vessel caused from pressure created by incoming feed liquid from a point of entry. The incoming feed liquid may subsequently push product liquid residing in an upper region of the vessel out of a second port at the top of the vessel. The product liquid residing in the vessel and exiting through the second port may subsequently be introduced to at least one point of use. In the alternative, product liquid may enter through a first port at the bottom of the vessel caused from pressure created by incoming product liquid from a treatment device. The incoming product liquid may subsequently push feed liquid residing in a lower region of the vessel out a second port. The feed liquid residing in the vessel and exiting through the second port may subsequently be introduced to a treatment device.

As used herein, the term "feed liquid" refers to a liquid that that possesses undesired characteristics or properties, or is otherwise unsuitable for an intended use, and therefore needs to be treated by one or more treatment devices. For example, feed liquid may be potable water that has a high concentration of naturally occurring dissolved mineral content, i.e., hardness. The concentration of mineral may need to be reduced before the water is suitable for residential use. The feed liquid may be water from any one of a number of sources, including water delivered from a municipal water system, or water from a well. Non-limiting examples of suitable water sources include potable water sources, for example, municipal water, well water, non-potable water sources, for example, brackish or salt-water, pre-treated semi-pure water, and any combination thereof. The feed liquid may contain dissolved salts or ionic or ionizable species including sodium, chloride, chlorine, calcium ions, magnesium ions, carbonates, sulfates or other insoluble or semi-soluble species or dissolved gases, such as silica and carbon dioxide. The feed liquid may also contain additives, such as fluoride, chlorate, and bromate species.

As used herein, the term "point of entry" refers to a port or other entrance that functions to deliver feed liquid to one or more vessels and/or one or more treatment devices. In certain embodiments, the point of entry may be configured to sample one or more feed liquids.

The feed liquid may be passed through one or more water treatment devices, such as an electrochemical water treatment device to create product liquid. As used herein, the term "treatment device" may refer to any device that can be used to remove or reduce the concentration level of any undesirable species from a fluid to be treated. Examples of suitable treatment apparatuses include, but are not limited to, devices related to ion-exchange resin, reverse osmosis, desalination, electrodeionization, electrodialysis, ultrafiltration, microfiltration, electrochemical devices, and capacitive deionization. The treatment device may include any device that provides water suitable to perform the requisite functions as disclosed herein.

In at least one embodiment the treatment device may be an electrochemical water treatment device. As used herein, the term "electrochemical water treatment device" refers to any number of electrochemical water treatment devices, non-limiting examples including, electrodeionization devices, electrodialysis devices, capacitive deionization devices, and any combination thereof.

According to at least one embodiment, feed liquid may be passed through one or more water treatment devices to create product liquid. As used herein, the term "product liquid" refers to a fluid with an acceptable concentration level of any undesirable species. For example, potable water may be processed to reduce the concentration of dissolved mineral content. In certain embodiments, the product liquid may comprise a hardness that is in a range of from about 2 gpg to about 6 gpg. In another aspect, the product liquid may comprise a hardness that is about 6 gpg. In yet a further aspect, the product liquid may comprise a hardness that is about 4 gpg. The hardness of the product liquid may be any hardness in between about 1 gpg and about 10 gpg, or any range in between these hardness values. The hardness of the product liquid may be of any value that is suitable for the purposes of performing in one or more applications, such as for use in a residential home, or for any other point of use, as discussed below.

In at least one embodiment, the methods disclosed herein may include introducing product liquid to a point of use. As used herein, the term "point of use" refers to a facility, an apparatus, a location, or any other place where the product liquid is used. The point of use may be in a residential, industrial or commercial facility. For example, a point of use may be a faucet, shower, toilet, or a domestic appliance, such as a clothes washer or dishwasher in a residence.

In certain embodiments, the methods disclosed herein may include providing a vessel. As used herein, the terms "vessel" and "tank" are used interchangeably and broadly mean any structure suitable for confining one or more process components, including gas, liquid and solid components and mixture thereof. The vessel may be open to the environment, or may be closed, or may have one section that is open and another section that is closed. The vessel may be closed to operate under pressure. The vessel may be sized and shaped according to a desired application and volume of feed or product to be stored. For example, the storage vessel may have an interior volume of 50 to 150 gallons. In certain embodiments, the vessel may be constructed to have an aspect ratio of height to diameter of 4/1 to 5/1. In various embodiments, the vessel may be constructed to be tall and thin to ensure optimal performance, for example, in a packed tank arrangement. The vessel may be constructed of any material suitable for the purposes of the methods and systems described herein. Non-limiting examples of suitable materials include steel, including stainless steel, fiberglass reinforced plastic, and polyvinyl chloride (PVC).

The vessel may be constructed to include at least one port. The ports may be configured to receive or release gases or liquids. The ports may be configured to be in communication with each other, or may be configured to be in isolation. The ports may be positioned at the top of the vessel, the bottom of the vessel, or anywhere in between that is suitable for accomplishing the methods described herein. In certain embodiments, one or more ports may be in fluid communication with at least one of a source of feed liquid, a treatment device, and a point of use. In various embodiments, a first port may be in fluid communication with at least one of a feed liquid and a treatment device. According to a further embodiment, a second port may be in fluid communication with at least one of a treatment device and a point of use.

In certain embodiments of the disclosure the vessel comprises one or more baffles. As used herein, the term "baffles" refers to a plate or partition that functions to impede the force or movement of one or more fluids. The baffles may be of any shape suitable for the purposes of providing a tortuous flow path as described in the methods and systems disclosed herein. In some embodiments, baffles may include either one or more individual curved elements. In other embodiments, the baffles may be perforated trays, as described below. The baffles may be asymmetrically or symmetrically arranged in the tank and may be of different sizes or may be the same size. The baffles may be constructed from the same material as the vessel, or constructed from different material.

In one or more embodiments, the baffles may be one or more perforated trays. The perforated trays may have a substantially rectangular shape, and the baffles may define a serpentine flow path throughout the interior of the vessel. In another preferred embodiment, the perforated trays may have a substantially circular shape, and define a spiral flow path throughout the vessel. The perforations may be placed in one or more locations on the tray. For example, the perforations may be placed at either end of a rectangular tray. The trays may then be arranged in the vessel so that a tray with perforations on one end of the tray is placed horizontally above a tray with perforations at the other end of the tray. When a plurality of these trays is arranged in a vertical fashion in a vessel, the effect is to provide a tortuous flow path through the vessel.

According to one or more embodiments, the vessel comprises a packing material. Any packing material may be used that is suitable for the purpose of providing a tortuous flow path as described in the methods and systems disclosed herein. The packing material may be positioned in the vessel at a pre-selected depth, may fill the entire volume of the vessel, or may be contained in a particular portion of the vessel. In at least one aspect, the packing material comprises a plurality of uniformly shaped components. Suitable shapes for the packing material may include at least one of beads, saddles, hooks, rings, pellets, blocks, discs, and tubes. For example, the packing material may comprise a plurality of uniformly shaped cylinder or cylinder-like shapes. In certain embodiments, the media composite may comprise a plurality of irregularly shaped particles. The packing material may be of any shape that would allow for gaps in the interstitial area between the particles and provide a tortuous flow path. The packing material may be constructed from any material suitable for the methods and systems disclosed herein. For example, the packing material may be made from a plastic or other polymer, steel, including stainless steel, a ceramic material, or any combination thereof.

In various embodiments, the vessel comprises a tubular structure. As used herein, the term "tubular" refers to a general tube-like structure having a longitudinal dimension that is significantly longer than its perpendicular cross-sectional dimension and is not intended to restrict an element to any particular cross-sectional shape or dimension, such as a circular cross section. For example, a tubular structure may include a structure exhibiting circular, oval, elliptical, rectangular, square, or polygonal cross-sections.

The tubular structure functions to provide a tortuous flow path as characterized in the methods and systems disclosed herein.

In accordance with one or more aspects, the method of controlling mixing between one or more fluids may comprise providing at least one vessel comprising one or more zones. The zones function to minimize or eliminate mixing between one or more fluids that may be present in the vessel. The one or more zones may be in fluid communication with one or more ports in the vessel. The one or more zones may be isolated from each other. For example, the vessel may comprise a first zone and a second zone. The first zone may be in fluid communication with feed liquid and the second zone may be in fluid communication with product liquid. In certain embodiments, the first and second zones are defined by a bladder positioned within the vessel. As used herein, the term "bladder" is intended to include any structure that substantially expands upon internal pressurization. The bladder may be in fluid communication with one or more ports in the vessel and may be constructed from an elastomeric flexible material.

In at least one embodiment, the bladder functions to minimize or eliminate mixing between a feed liquid and a product liquid. For example, the feed liquid may be introduced through a first port in the vessel that is in fluid communication with a bladder positioned within the vessel. Pressure from incoming feed liquid may subsequently fill the bladder with feed liquid. The remaining volume not filled by the bladder in the vessel may be filled with product liquid that is introduced through a second port in the vessel. The feed liquid and product liquid are physically separated from one another by the exterior walls of the bladder. In a similar manner as discussed above, incoming feed liquid may subsequently force product liquid out of the vessel through one or more ports in fluid communication with the product liquid, and incoming product liquid may likewise force feed liquid out of the bladder through one or more ports in fluid communication with the bladder.

In accordance with one or more embodiments, a method of providing product liquid is provided. The method includes passing a feed liquid through a treatment device to create product liquid having a volume. The volume of product liquid may be a quantity of product liquid passed through a treatment device. For example, the volume may correspond to one or more batches of product liquid created by a treatment device. The method may include introducing at least a portion of the volume of product liquid to at least one of a first zone of a vessel and at least one point of use. The first zone of the vessel and the point of use may be provided as discussed and described above. The method may further include removing at least a portion of the volume of product liquid present in the first zone of the vessel. For example, the portion of the product liquid removed from the first zone may be introduced to at least one point of use. The method may further include introducing the feed liquid to at least one of a second zone of the vessel and a treatment device. The treatment device may be provided as discussed and described above. The method may further comprise measuring the flow rate of any product liquid introduced to at least one point of use. The measurement may be performed by using a flow rate sensor that is in communication with a control system. The method may further comprise calculating the volume of product liquid introduced to at least one point of use based on the measured flow rate. The calculation may be performed by one or more components provided by the control system. The method may further comprise controlling the introduction of any feed liquid introduced to the treatment device based on the volume of product liquid introduced to at least one point of use. Controlling the introduction of feed liquid may be performed by using one or more valves that are in communication with the control system. The method may function to provide an uninterrupted supply of product liquid to at least one point of use.

FIG. 1 illustrates a schematic flow diagram of a baffled tank treatment system 10 according to one or more embodiments of the methods and systems described herein. Treatment system 10 includes point of entry 113 that may deliver feed 103 from one or more sources. Treatment system 10 may comprise one or more baffle tanks 100. Baffle tank 100 may be pressurized. Feed 103 may be delivered to system 10 in pressurized form, or may be pressurized within the system. Treatment system 10 may include one or more sensors, including pressure sensor 110. Pressure sensor 110 may monitor the pressure of feed 103. Baffle tank 100 may comprise one or more plates 101 placed within the tank. The plates 101 may be arranged in a parallel configuration and may be placed at regular intervals within baffle tank 100. Plates 101 may be fixed to the interior of baffle tank 100 and may comprise one or more perforations 111. The orientation of plates 101 may be perpendicular to the long axis of baffle tank 100. As illustrated in the figure, one or more perforations 111 may be located on a portion of the plate. The orientation of the plates may be arranged to allow for perforations 111 of adjacent plates to be offset each other. For example, perforations 111 may be on opposite vertical sides of baffle tank 100. Baffle tank 100 may be constructed to have a large height to diameter aspect ratio. For example, the aspect ratio may range from three to six. A port for feed 104 may be positioned at one end of the baffle tank 100 and may be in fluid communication with processing device 102. Feed 103 may be in fluid communication with inlet 105 to processing device 102. Processing device 102 generates product 112 that exits through port 106. Product 112 may be in fluid communication with at least one point of use 107. One or more control valves 109 may be located in between baffled tank 100 and processing device 102.

As illustrated in FIG. 1, when liquid flows through baffled tank 101 from feed port 104 to product port 108, it may move along a serpentine path as it flows through perforations 111 in the parallel series of plates 101. The serpentine path is both significantly longer than the height of the baffled tank 100 and the cross-sectional area of the serpentine path is significantly smaller than the cross-sectional area of the baffled tank 100. This arrangement minimizes mixing of product entering baffled tank 100 and feed from feed port 104 as the feed pushes the product out of baffled tank 100. Mixing is minimized because the interface area between the product and the feed has been reduced.

Figure 2:
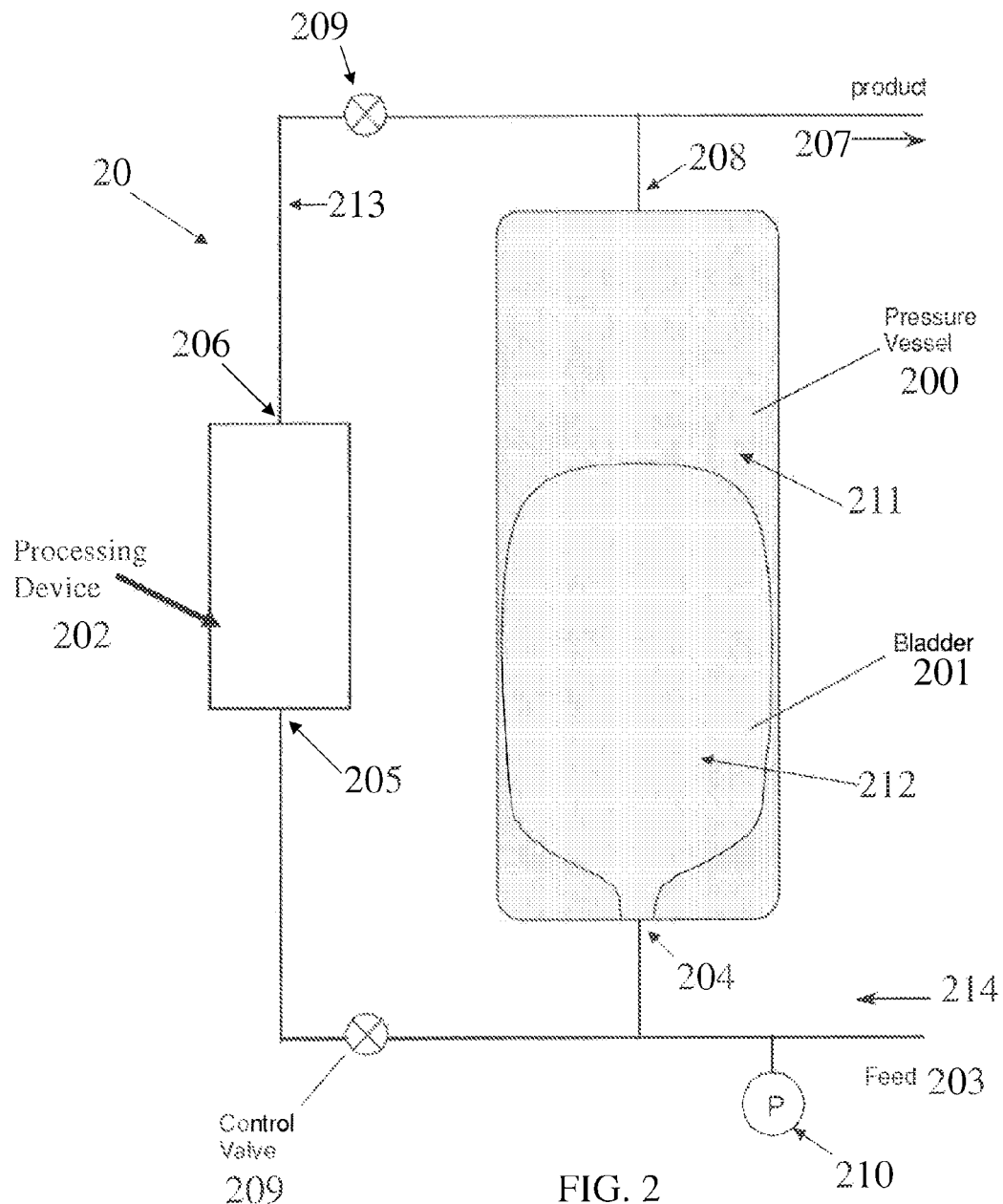
FIG. 2 is a diagram of a bladder tank system in accordance with one or more aspects of the disclosure.

FIG. 2 illustrates a schematic flow diagram of a bladder tank treatment system 20 in accordance with one or more embodiments of the methods and systems described herein. Treatment system 20 includes point of entry 214 that may deliver feed 203 from one or more sources. Treatment system 20 may include one or more tanks 200. Tank 200 may be pressurized. Feed 203 may be delivered to system 20 in pressurized form, or may be pressurized within the system. Treatment system 20 may include one or more sensors, including pressure sensor 210 that may monitor the pressure of feed 203. Tank 200 may comprise an internal collapsible bladder 201 that functions to divide the interior of tank 200 into two regions 211 and 212 that are separated by a wall of collapsible bladder 201. Region 211 represents the volume outside collapsible bladder 201 and region 212 represents the volume inside collapsible bladder 201. Region 212 of collapsible bladder 201 may be equal to or slightly greater than the volume of tank 200 when fully expanded. Therefore, the volume of either region 211 or 212 may range from zero to the full volume of tank 200, depending on whether collapsible bladder 201 is completely expanded or completely collapsed.

Port 204 for feed 203 may be in fluid communication with region 211 or 212 within tank 200. Port 204 may be pressurized. Feed 203 may be delivered to port 204 from a pressurized source of feed. Feed 203 may also be delivered to port 205 of processing device 202, where feed 203 is processed to produce product 213 that exits processing device 202 through port 206. Port 206 of processing device 202 may be in fluid communication with tank 200 through port 208. Region 211 may comprise product 213 and may be in fluid communication with port 207. Control valves 209 may be located in between tank 200 and processing device 202. Region 212 may be in fluid communication with port 204 and comprise feed 203. This configuration may allow for feed 203 to be delivered to region 212 of tank 200 without mixing with product 213 that may be present in region 211. Feed 203 from region 212 may be delivered to processing device 202 and at the same time product 213 may be delivered to region 211 of tank 200. Feed 203 may be pushed into region 212 by a pressurized source of feed when product 213 is withdrawn from the system and introduced to at least one point of use 207, for example, when a tap is opened in a residential household. Feed 203 may be drawn into processing device 202 from region 212 and at the same time product 213 may be delivered from processing device 202 to region 211 by way of one or more pumps within the processing system.

Figure 3:
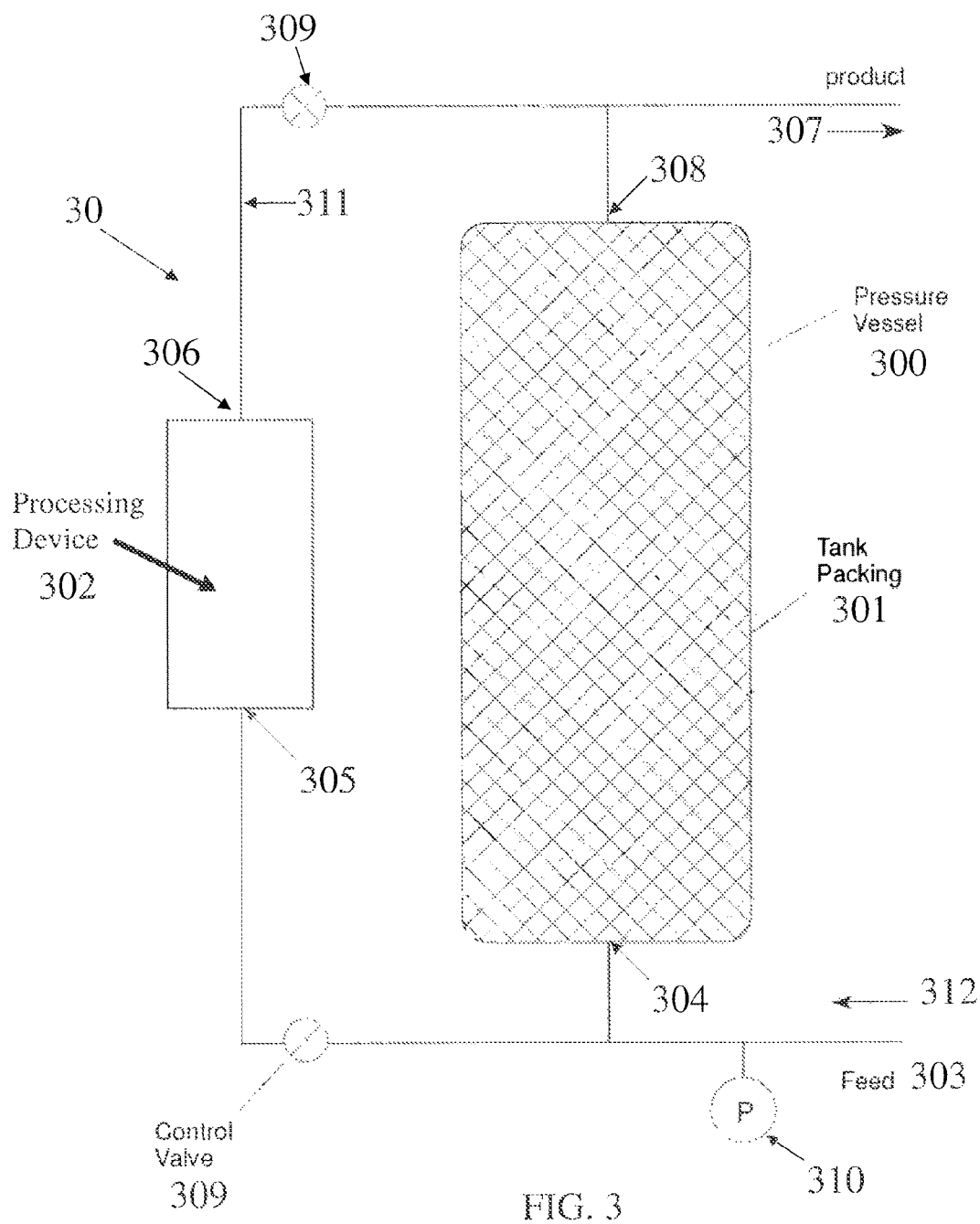
FIG. 3 is a diagram of a packed tank system in accordance with one or more aspects of the disclosure.

FIG. 3 illustrates a schematic flow diagram of a packed tank treatment system 30 in accordance with one or more embodiments of the methods and systems described herein.

Treatment system 30 includes point of entry 312 that may deliver feed 303 from one or more sources. Treatment system 30 may include one or more tanks 300. Tank 300 may be pressurized. Feed 303 may be delivered to system 30 in pressurized form, or may be pressurized within the system. Treatment system 30 may include one or more sensors, including pressure sensor 310 that may monitor the pressure of feed 303. Tank 300 may be partially or completely filled with one or more packing materials 301. Packing material 301 may be provided and characterized as discussed above.

Feed 300 may be delivered to port 304 of tank 300. Port 304 may be positioned at one end of tank 300. Feed 303 may also be in fluid communication with processing device 302 through port 305, where it is processed to produce product 311. Product 311 may exit processing device 302 through port 306 and may enter tank 300 through port 308. Product 311 may also exit processing device 302 and flow out to at least one point of use 307. Product 311 may be drawn from tank 300 from the pressure of incoming feed 303. Tank packing material 301 may function to minimize mixing between product 311 and feed 303 within tank 300.

Figure 4:
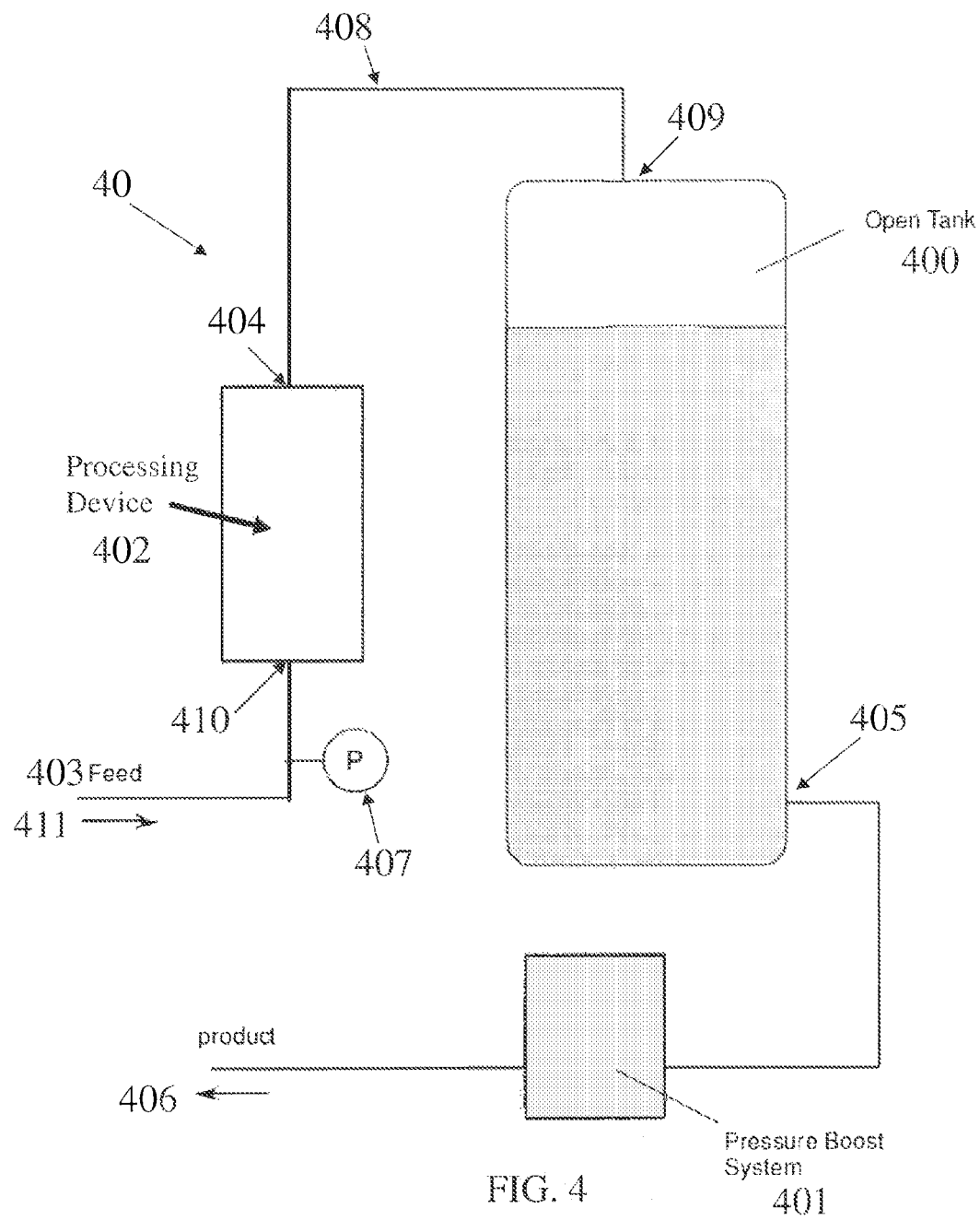
FIG. 4 is a diagram of an open tank system in accordance with one or more aspects of the disclosure.

FIG. 4 illustrates a schematic flow diagram of an open tank system 40 in accordance with one or more embodiments of the methods and systems described herein. Treatment system 40 includes point of entry 411 that may deliver feed 403 from one or more sources. Treatment system 40 may include one or more tanks 400. Tank 400 may be an unpressurized or open tank. Treatment system 40 may also include processing device 402 and a pressure boost system 401. Feed 403 may be introduced to processing device 402 through port 410. Feed 403 may be delivered to system 40 in pressurized form, or may be pressurized within the system. Treatment system 40 may include one or more sensors, including pressure sensor 407 that may monitor the pressure of feed 403. Port 404 for product 408 that is generated in processing device 402 may be in fluid communication with tank 400 through port 409. Product 408 may be stored within tank 400 at ambient pressure. Port 405 from tank 400 may be in fluid communication with pressure boost system 401. Pressure boost system 401 may function to increase the pressure of product 408 when delivered to at least one point of use 406. Pressure boost system 401 may provide product 408 at an elevated pressure when it is withdrawn by at least one point of use 406. For example, a point of use may be the tap to a faucet, and product 408 may be delivered when the tap is opened.

Tank 400 may comprise one or more sensors for detecting fluid levels. For example, tank 400 may comprise three or more sensors that function to detect the level of the product within the tank. The sensors may be positioned in one or more locations in tank 400. For example, the sensors may be positioned near the top, near the bottom, and anywhere in between. Treatment system 40 may further comprise a control system in communication with the sensors. For example, when product 408 is used, the level of the fluid within tank 400 goes down. If the level of fluid falls below a sensor placed at the mid-level of tank 400, a signal may be sent using the control system, to processing device 402, to signal processing device 402 to begin producing product 408. As product 408 is produced, it may be directed from the processing device to tank 400. Subsequently, the fluid level of product 408 within tank 400 will rise. When the fluid level of product 408 reaches a sensor positioned at the top of tank 400, a signal may be sent to processing device 402 to cease the production of product 408.

Figure 5:
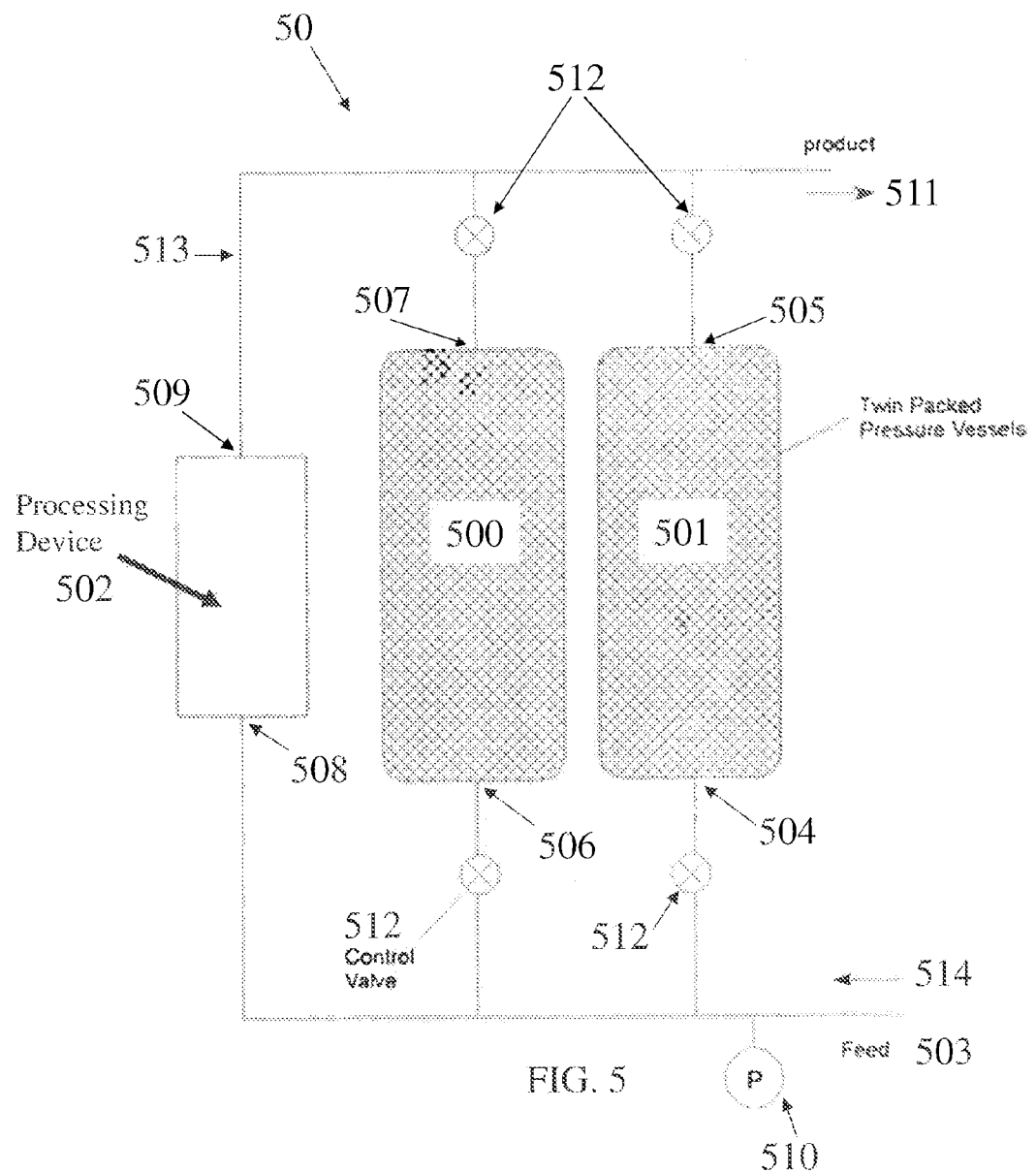
FIG. 5 is a diagram of a twin packed tank system in accordance with one or more aspects of the disclosure.

FIG. 5 illustrates a schematic flow diagram of a tank system 50 in accordance with one or more embodiments of the methods and systems described herein. Tank system 50 may include one or more tanks. For example, as shown in FIG. 5, treatment system 50 includes two tanks 500 and 501 that may each be filled with packing material. Tanks 500 and 501 may include ports 506 and 504 and ports 507 and 505. Ports 506 and 504 may be in communication with processing device 502. Treatment system 50 includes point of entry 514 that may deliver feed 503 from one or more sources. Feed 503 may be in communication with ports 506 and 504. Feed 503 may be delivered to system 50 in pressurized form, or may be pressurized within the system. Tanks 500 and 501 may be pressurized. Treatment system 50 may include one or more sensors, including pressure sensors 510 that may monitor the pressure of feed 503. Treatment system 50 may also comprise processing device 502. Feed 503 may enter processing device 502 through port 508, where it is processed to generate product 513. Processing device 502 may include port 509 that may be in fluid communication with tanks 500 and 501 and at least one point of use 511. Tanks 500 and 501 may include ports 507 and 508 where product 513 may enter the tanks or may exit the tanks and proceed to port 511.

Treatment system 50 may comprise a control system. A collection of control valves 512 may be configured to switch tanks 500 and 501 between two processing states. In processing state 1, port 506 of tank 500 may be configured to be in fluid communication with feed 503 and port 507 may be in fluid communication with point of use 511. Port 504 to tank 501 may be configured to be in fluid communication with port 508 to processing device 502 and port 505 may be in fluid communication with port 509 of processing device 502. Thus, in processing state 1, tank 500 may be available to supply product and tank 501 may have its contents processed from feed to product through processing device 502. In the alternative, processing state 2 allows the status of the two tanks to be switched. In certain embodiments, product may be withdrawn from tank 500 while the contents of tank 501 are processed. When product from tank 500 is exhausted, the system switches states, and product may be withdrawn from tank 501, while the contents of tank 500 are processed. When product is withdrawn from either of the tanks, it may be pushed out through ports 507 or 505 by the pressure of the incoming feed through ports 506 or 504. The tank packing may function to minimize mixing between product and feed liquids.

Figure 6:
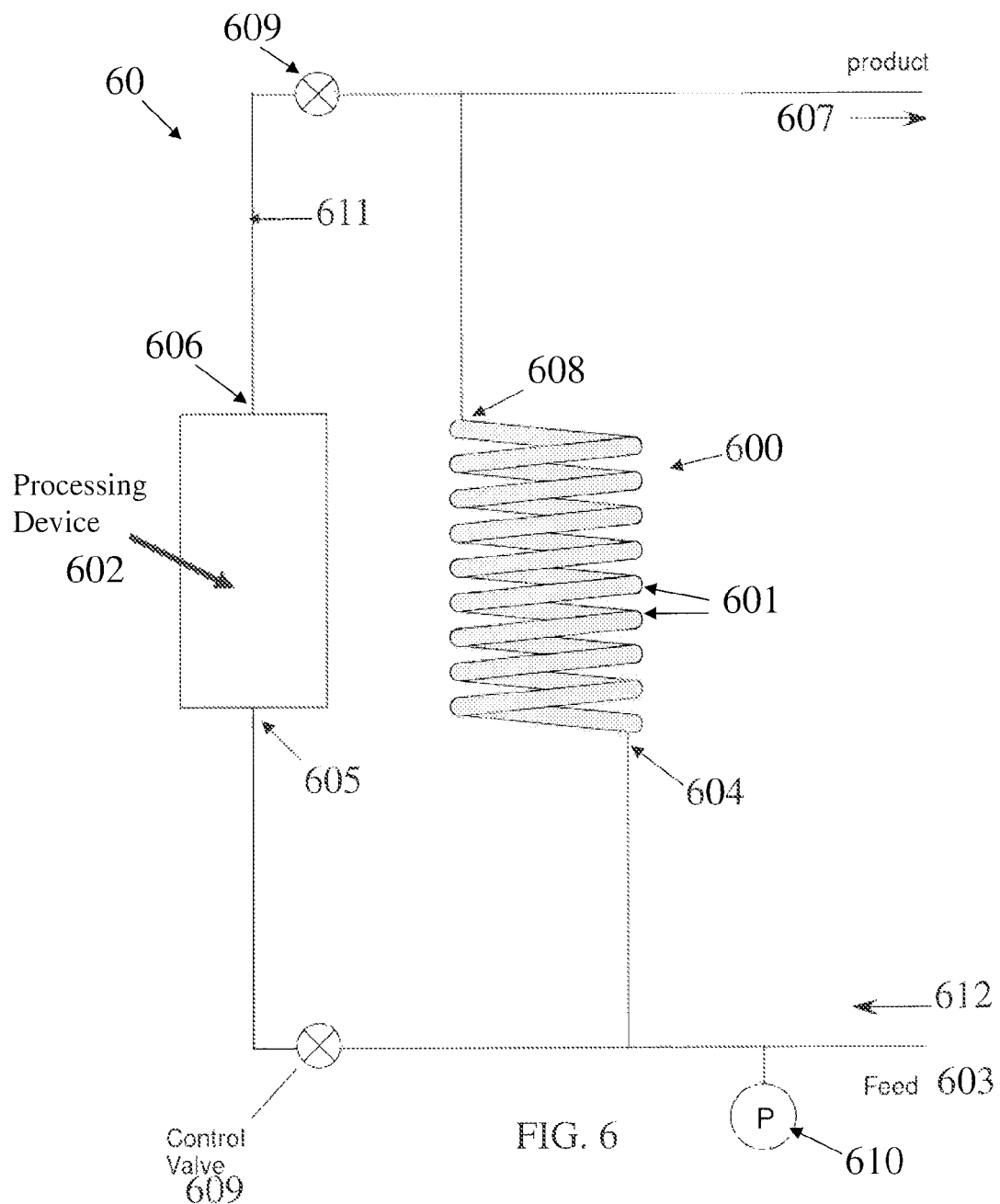
FIG. 6 is a diagram of a tube tank system in accordance with one or more aspects of the disclosure.

FIG. 6 illustrates a schematic flow diagram of a tube tank system 60 in accordance with one or more embodiments of the methods and systems described herein. As shown in FIG. 6, treatment system 60 includes point of entry 612 that may deliver feed 603 from one or more sources. Treatment system 60 may include one or more tube tanks 600. Tube tank 600 may comprise one or more lengths of tubing 601. In certain embodiments tubing 601 may be pressure tubing. Feed 603 may be delivered to system 50 in pressurized form, or may be pressurized within the system. Tube tank 600 may be pressurized. Treatment system 60 may include one or more sensors, including pressure sensor 610 that may monitor the pressure of feed 603. The length and inside diameter of tubing 601 may be selected so as to provide a desired volume.

Tube tank 600 may comprise ports 604 and 608. Port 604 may be positioned at one end of tube tank 600 and port 608 may be positioned at another end of tube tank 600. Treatment system 60 may comprise processing device 602 as previously described and discussed. Feed 603 may be in communication with port 604. Port 605 of processing device may be in fluid communication with port 604 of tube tank 600. Port 606 of processing device may be in fluid communication with port 608. Feed 603 may pass through port 605 of processing device 602 to produce product 611. Product 611 may be in communication with port 608 of tube tank 600 and at least one point of use 607. Tubing 601 may be configured to minimize mixing of feed 603 and product 611 at an interface where they are in contact with each other and to minimize the size of this interface area.

Treatment system 60 may include a control system that includes one or more control valves 609. A first processing state may be defined such that control valves 609 are configured to isolate processing device 602. In the first processing state, feed 603 may enter processing system 602 through port 605 to produce product 611. Feed 603 may be delivered to processing device 602 from tube tank 600. When processing has progressed to a desired point, a second processing state may be defined such that control valves 609 are configured to deliver product 611 to tank 600 through port 608 or to at least one point of use 607. In the second processing state, product 611 that may be present in processing device 602 may be replaced with feed 603 from port 603 or from point of entry 612. The control system may be configured to switch treatment system 60 between the first and second processing state. The control system may be configured to switch between the first and second processing state based on a batch mode for processing in processing device 602. For example, a processing device 602 may process a batch of feed under the first processing state, where control valves 609 are configured to isolate process device 602. When the batch of feed has been completely processed to produce a batch of product, control valves 609 may be configured for the second processing state. When a new batch of feed is desired, control valves 609 may again be configured for the first processing state, and a new batch of feed may be processed.

The treatment systems described here may also comprise one or more fluid control devices, such as pumps, valves, regulators, sensors, pipes, connectors, controllers, power sources, and any combination thereof. For example, the treatment system may comprises one or more sensors or monitoring devices disposed to measure at least one property of the water or an operating condition of the water treatment system. Non-limiting examples of sensors include composition analyzers, pH sensors, temperature sensors, conductivity sensors, pressure sensors, and flow sensors.

The storage systems disclosed herein are not limited in their application to the details of construction and the arrangements of components, systems, or subsystems set forth herein, and are capable of being practiced or of being carried out in various ways. The use of the storage systems disclosed herein may provide several advantages. The use of a the singular storage device may reduce or eliminate the use of supplemental or additional storage devices and the respective tubing, piping, valves, and other hardware associated with those additional devices. The storage system may provide for downsizing or eliminating equipment associated with storage and delivery of feed and product liquids, which may be expensive and/or inefficient. The use of the storage systems as described herein may reduce inefficiencies in a water treatment system, since treated water may be conveniently stored for later use. For example, water may be stored during periods of low use to be delivered during periods of high use. Water may also be stored when utility rates may be at a lower rate, for example, during the night. One or all of these benefits may reduce operating costs and/or increase the environmental friendliness of a water treatment system and its operation.

EXAMPLES

The systems and methods described herein will be further illustrated through the following examples, which are illustrative in nature and are not intended to limit the scope of the disclosure.

Example 1—Packed Tank

A test was performed to evaluate the capability of a packed tank system, as illustrated in FIG. 3. The packed tank comprised an Enpress 1665™ type tank with a 49-gallon capacity (Enpress LLC, Eastlake, Ohio). The tank was pressurized and included a 4.5 inch riser cap and a 1.0 inch riser pipe. The tank was filled to capacity with 2 inch Hacketten Tri-Pack™ random packing (Raschig Jaeger Technologies) that had a void fraction of 94%.

Figure 7:
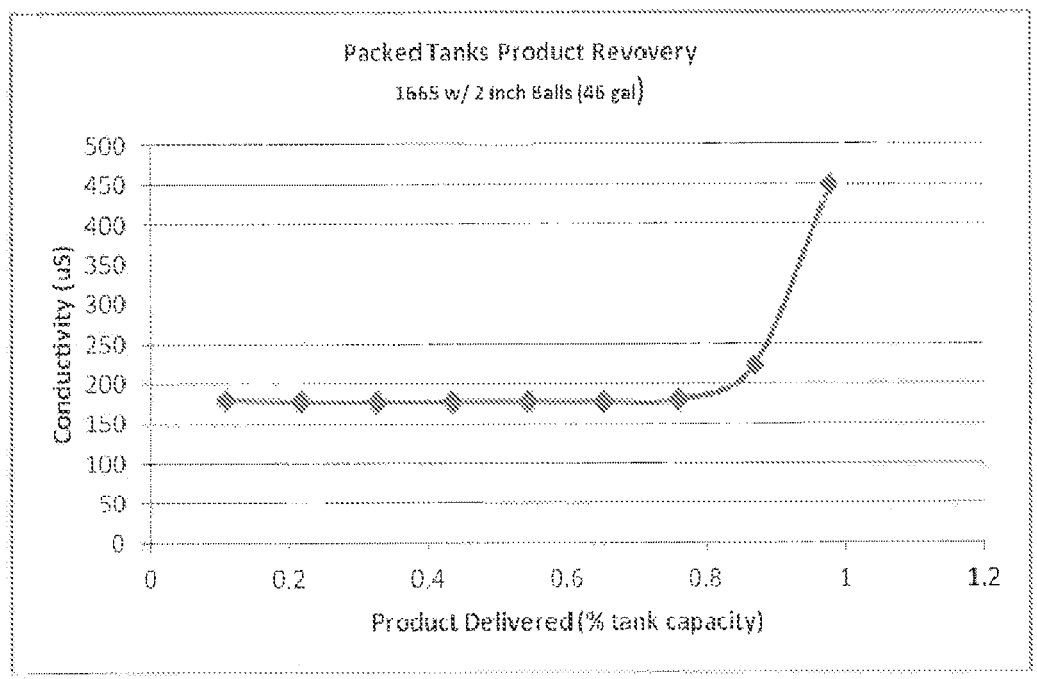
FIG. 7 is a graph illustrating the results from testing performed on a packed tank system in accordance with one or more aspects of the disclosure.

A recovery test was performed where the packed tank was initially filled through a top port with product water with an ionic conductivity of about 200 μS/cm. Pressurized feed water with an ionic conductivity of about 1000 μS/cm was then introduced into a bottom port of the tank through the riser pipe at a rate of approximately two gallons per minute, which pushed water out of the top of the tank. The conductivity of the water coming out of top of the tank was continuously monitored until the higher conductivity of the feed water was detected. The results of the recovery test are summarized in FIG. 7. As shown in the figure, the plot indicates that about 90% of the product water was recovered before the feed water was detected.

Example 2—Baffle Tank

A recovery test similar to Example 1 was performed with a baffle tank system, an example of which is illustrated in FIG. 1. The baffle tank was constructed with steel perforated baffle plates and had an effective volume of approximately 60 gallons.

Figure 8:
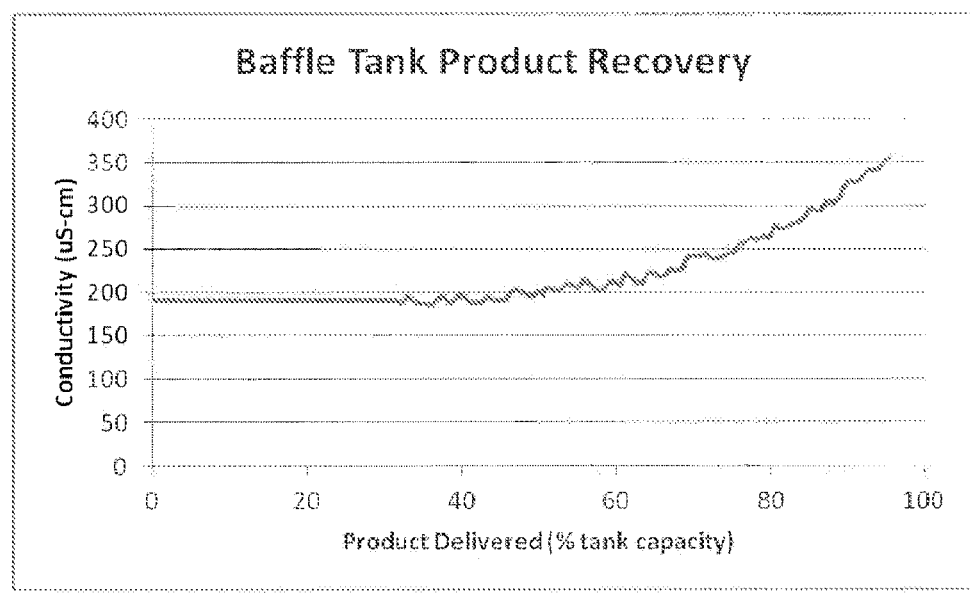
FIG. 8 is a graph illustrating the results from testing performed on a baffle tank system in accordance with one or more aspects of the disclosure.

A recovery test was performed under the same conditions as in Example 1. The results of the test are illustrated in FIG. 8 and indicate that about 70% of the product water was recovered before feed water was detected.

Example 3—Tube Tank

A recovery test similar to Examples 1 and 2 was performed on a tube tank system, an example of which is illustrated in FIG. 6. The tube tank was constructed from a continuous 65 ft length of 1.0 inch internal diameter tubing to give a tube volume of 2.65 gallons.

Figure 9:
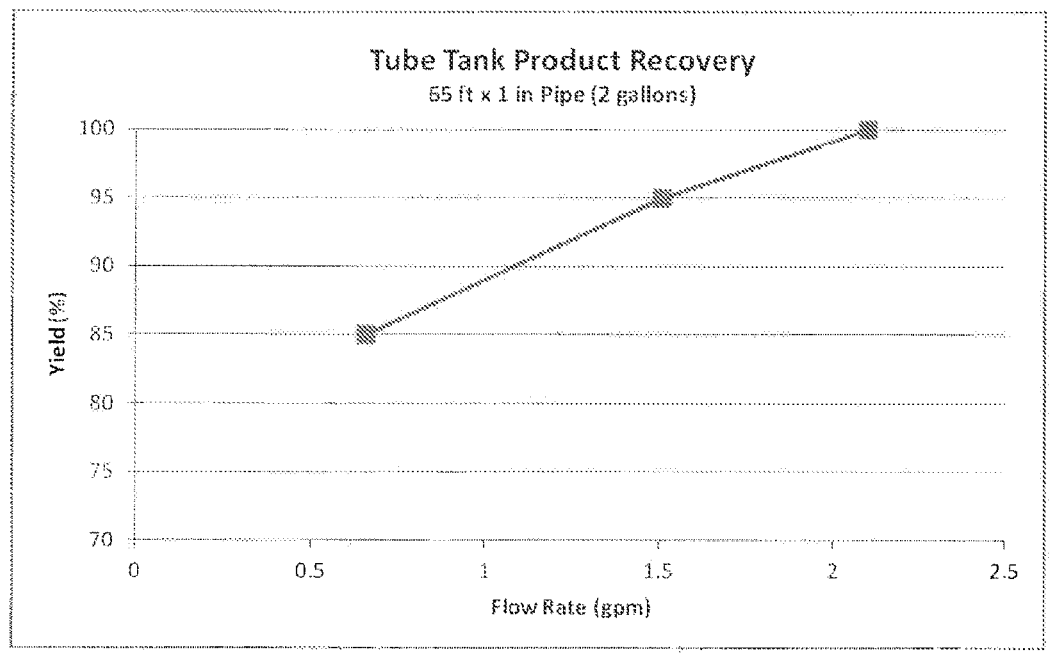
FIG. 9 is a graph illustrating the results from testing performed on a tube tank system in accordance with one or more aspects of the disclosure.

The recovery test was performed under the same conditions as Examples 1 and 3, except three different flow rates were tested. The results of the test are illustrated in FIG. 9 and indicate that with a flow rate of 0.7 gpm, the recovery rate was about 85%; with a flow rate of about 1.5 gpm, the recovery rate was about 95%; and with a flow rate of about 2.1 gpm, the recovery rate was about 100%, with a measurement error of about +/−2%.

The systems and methods described herein are not limited in their application to the details of construction and the arrangement of components set forth in the description or illustrated in the drawings. The invention is capable of other embodiments and of being practiced or of being carried out in various ways. Also, the phraseology and terminology used herein is for the purpose of description and should not be regarded as limiting. The use of "including," "comprising," "involving," "having," "containing," "characterized by," "characterized in that," and variations thereof herein is meant to encompass the items listed thereafter, equivalents thereof, as well as alternate embodiments consisting of the items listed thereafter exclusively. Use of ordinal terms such as "first," "second," "third," and the like in the claims to modify a claim element does not by itself connote any priority.

Those skilled in the art would readily appreciate that the various parameters and configurations described herein are meant to be exemplary and that actual parameters and configurations will depend upon the specific application for which the systems and methods directed toward separation treatment processes using composite media of the present disclosure are used. Those skilled in the art will recognize, or be able to ascertain using no more than routine experimentation, many equivalents to the specific embodiments described herein. For example, those skilled in the art may recognize that the apparatus, and components thereof, according to the present disclosure may further comprise a network of systems or be a component of a treatment process using a storage system as described herein. It is, therefore, to be understood that the foregoing embodiments are presented by way of example only and that, within the scope of the appended claims and equivalents thereto, the disclosed storage systems and methods may be practiced otherwise than as specifically described. The present apparatus and methods are directed to each individual feature or method described herein. In addition, any combination of two or more such features, apparatus or methods, if such features, apparatus or methods are not mutually inconsistent, is included within the scope of the present disclosure.

Further, it is to be appreciated various alterations, modifications, and improvements will readily occur to those skilled in the art. Such alterations, modifications, and improvements are intended to be part of this disclosure, and are intended to be within the spirit and scope of the disclosure. For example, an existing facility may be modified to utilize or incorporate any one or more aspects of the disclosure. Thus, in some cases, the apparatus and methods may involve connecting or configuring an existing facility to comprise one or more storage systems as disclosed herein. Accordingly, the foregoing description and drawings are by way of example only. Further, the depictions in the drawings do not limit the disclosures to the particularly illustrated representations.

While exemplary embodiments of the disclosure have been disclosed many modifications, additions, and deletions may be made therein without departing from the spirit and scope of the disclosure and its equivalents, as set forth in the following claims.

The invention claimed is:

1. A method of controlling mixing between a first fluid and a second fluid comprising:
   providing a vessel comprising a tortuous flow path and a first port and a second port;
   introducing the first fluid to the vessel through the first port; and
   removing the first fluid from the vessel through the first port while introducing the second fluid to the vessel through the second port,
   wherein the tortuous flow path minimizes mixing between the first fluid and the second fluid within the vessel.

2. The method of claim 1, wherein the tortuous flow path is provided by a plurality of baffles.

3. The method of claim 2, wherein each baffle of the plurality of baffles is a horizontal tray comprising perforations placed in one or more locations on the tray, the plurality of horizontal trays arranged in a vertical configuration in the vessel so as to provide the tortuous flow path.

4. The method of claim 3, wherein each baffle of the plurality of baffles is substantially rectangular in shape, and the tortuous flow path is a serpentine flow path.

5. The method of claim 3, wherein each baffle of the plurality of baffles is substantially circular in shape, and the tortuous flow path is a spiral flow path.

6. The method of claim 1, wherein the first port is positioned at the top of the vessel and the second port is positioned at the bottom of the vessel.

7. The method of claim 1, wherein the tortuous flow path is provided by a tubular structure.

8. The method of claim 7, wherein the tubular structure has at least one of a circular, oval, elliptical, rectangular, square, and polygonal cross-section.

9. The method of claim 1, wherein the tortuous flow path is provided by packing material.

10. A method of controlling mixing between a first fluid and a second fluid comprising:
    providing a vessel comprising a first zone, a second zone, a first port, and a second port;
    introducing the first fluid to the first zone of the vessel through the first port; and
    removing the first fluid from the first zone of the vessel through the first port while introducing the second fluid to the second zone through the second port;

wherein the first and second zones are defined by a bladder positioned within the vessel, the bladder configured as a collapsible bladder sized to be slightly greater than a volume of the vessel when fully expanded.

* * * * *